June 30, 1959 W. W. PHARIS 2,892,893

DROP-BACK TELEPHONE SELECTOR

Filed Aug. 22, 1956 6 Sheets-Sheet 1

INVENTOR.
WILLIAM W. PHARIS

BY Henry H. Gage
AGENT

June 30, 1959 W. W. PHARIS 2,892,893

DROP-BACK TELEPHONE SELECTOR

Filed Aug. 22, 1956 6 Sheets-Sheet 2

June 30, 1959 W. W. PHARIS 2,892,893

DROP-BACK TELEPHONE SELECTOR

Filed Aug. 22, 1956 6 Sheets-Sheet 3

June 30, 1959 W. W. PHARIS 2,892,893

DROP-BACK TELEPHONE SELECTOR

Filed Aug. 22, 1956 6 Sheets-Sheet 4

June 30, 1959 W. W. PHARIS 2,892,893

DROP-BACK TELEPHONE SELECTOR

Filed Aug. 22, 1956 6 Sheets-Sheet 5

SEL. LIS

United States Patent Office 2,892,893
Patented June 30, 1959

2,892,893

DROP-BACK TELEPHONE SELECTOR

William W. Pharis, Rochester, N.Y., assignor to General Dynamics Corporation, Rochester, N.Y., a corporation of Delaware Application August 22, 1956, Serial No. 605,531

5 Claims. (Cl. 179—18)

The present invention relates to telephone systems in general, and more particularly to a selector of the drop-back type which is adapted for use in such a system.

At the present time, it is the practice to provide a drop-back type local selector suitable for use in a so-called 2–5 switching system such as the selector shown and described in application Serial No. 502,055, titled Drop-Back Type Selector, filed April 18, 1955, and assigned to the same assignee as the present application. Such a selector is for use in a local switch train and is capable of being unlocked after it has absorbed a plurality of signals or digit impulses which represent a local office code. Following the unlocking operation of the selector, a hunting operation is carried out within the level selected in response to the receipt of the impulses of the next succeeding digit. Such selectors may be adapted as in the case of the selector referred to in the above-identified application for absorbing an office code in which the intermediate and last absorbed digit impulses are identical to each other and different from the impulses of the first digit. In addition, the selector is adapted to respond to the impulses of a single unlocking digit identical to the final office code digit. In offices of the above-referred to type, access to the level corresponding to the first office code digit may be had only after the unlocking operation has been carried out.

It is an object of my invention to provide a new and improved drop-back type selector.

Another object of my invention is to provide a drop-back type selector capable of being unlocked with respect to all levels following the transmission of the impulses of the office code digits to the selector and capable of being unlocked with respect to certain levels only upon the transmission of the impulse of a different code digit including a first digit similar to the first office code digit.

Another object of my invention is to provide a drop-back selector which unlocks responsive to the receipt of the impulse of an office code of digits comprising a particular first digit and two succeeding digits, in which the two succeeding digits are identical with each other and different from the first signal; which unlocks responsive to the receipt of the impulses of a single sigit identical to the last office code digit; and which unlocks with respect to only the level corresponding to the first office code digit upon the receipt of the impulses of two successive digits of the value of the first office code digit.

I accomplish these and other objects in a telephone system comprising a local first selector having a set of switch wipers of the well-known step-by-step type. The selector includes means for advancing the wiper set in a primary direction from the normal position of the set to any one of a plurality of levels including a first and a second particular level. Each level includes a plurality of terminal sets to be engaged by the wipers. Means within the selector causes the wipers to advance in a secondary direction in a hunting operation until an idle terminal set has been engaged by the wiper set. A circuit is provided for initially energizing the secondary advancing means and thereby initiating the operation of the hunting means in order to advance the wiper set into engagement with the first terminal set in a selected level following the selection of that level. The selector includes releasing means operative for restoring the wiper set from an advanced position to its normal position. In order to control the selector, other well-known means, such as a subscriber station, is provided external to the selector for seizing and thereafter transmitting directive signals or digit impulses to the selector in order to directively operate the primary advancing means.

Also included in the preferred embodiment of my invention is registering means having a normal condition and which is operative to first, intermediate and last operated conditions in response to a first primary movement of the wiper set to the first level, an intermediate movement to the second level and a final movement to the second level, respectively, for registering each of the movements caused by the transmission of the impulses of the digits of an office code to the selector. Means including registering means in any one of its operated conditions is effective for energizing the releasing means in order to restore the wiper set to its normal condition and thereby prepare the selector for its response to the next received signal. The registering means in its third operated or unlocking condition is thereafter operative in response to the subsequent primary movement of the wiper set to any one of the levels for completing the secondary means operating circuit in order to initiate a hunting operation within any one of the levels selected subsequent to the transmission of the impulses of the office code digits. The registering means in its normal condition is also operative in response to a first primary movement of the wiper set to the second level for placing the registering means in the above-mentioned third operated condition, so that the selector may be advanced within the next selected level without the transmission of the full office code.

The objects of my invention are achieved in the above-described system by making the registering means in its first operated condition further responsive to the subsequent movement of the wiper set to the first level for completing the secondary means operating circuit in order to unlock the selector with respect to the first level only. Thus, in the preferred embodiment of my invention the wiper set may be advanced within the first level following two successive primary advances of the wiper set to the first level when the impulses of two successive digits corresponding to the first office code digit are transmitted to the selector.

Further objects and advantages of my invention will become apparent as the following description proceeds, and features of novelty which characterize the invention will be poined out with particularity in the claims annexed to and forming a part of this specification.

For a better understanding of my invention, reference may be had to the accompanying drawings, in which:

Fig. 1 shows the order in which Figs. 2–7 are to be arranged;

Fig. 2 shows in block form: a subscriber's line, a line circuit, and a line finder; and in schematic form, a part of a local first selector L1S;

Figs. 3–6 show in schematic form the remainder of local first selector L1S; and, Fig. 7 shows in block form the remainder of the office apparatus to which selector L1S has access and toll switching office apparatus which also has access to the same office apparatus.

Figures 1, 2:
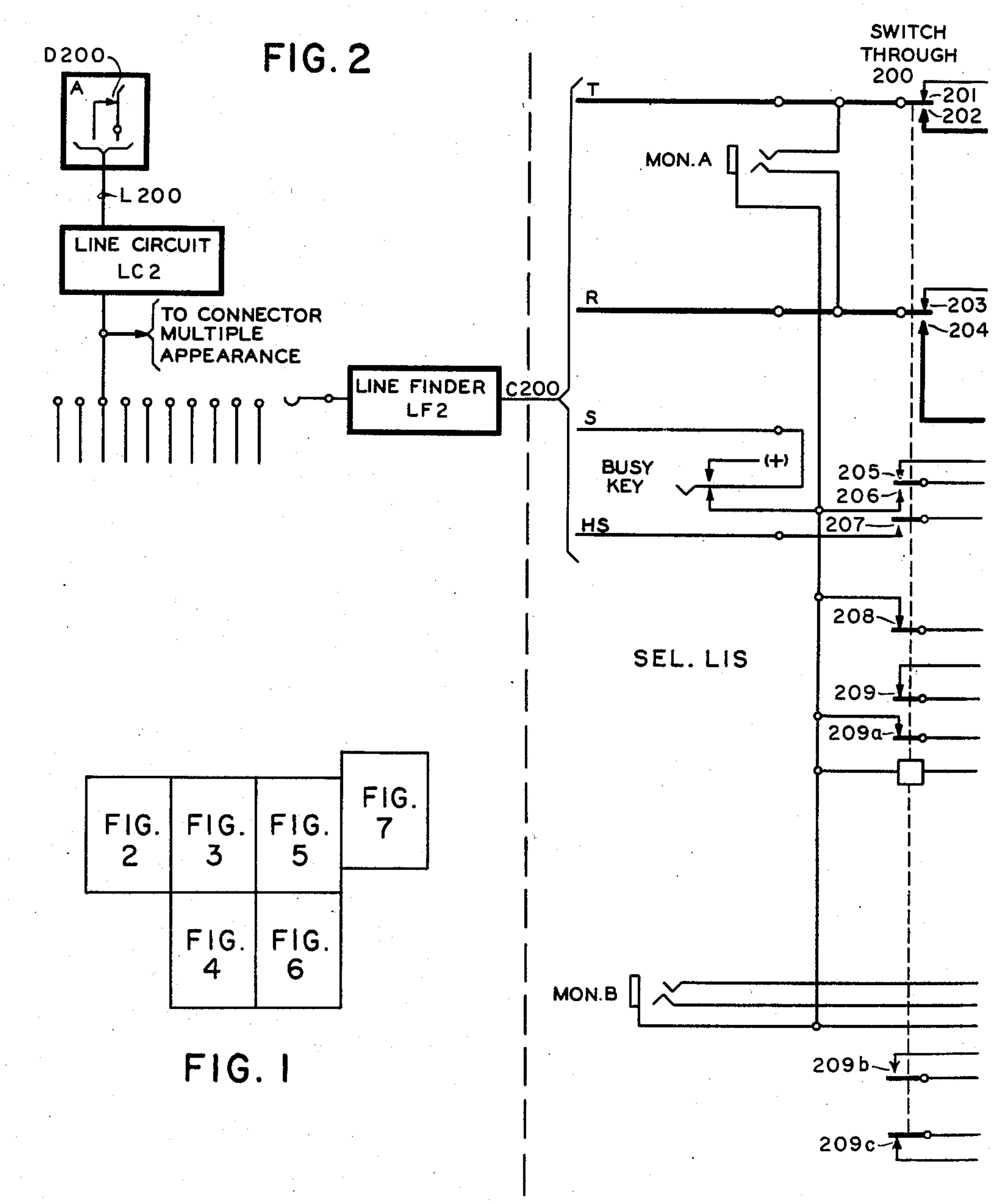
Figure 3:
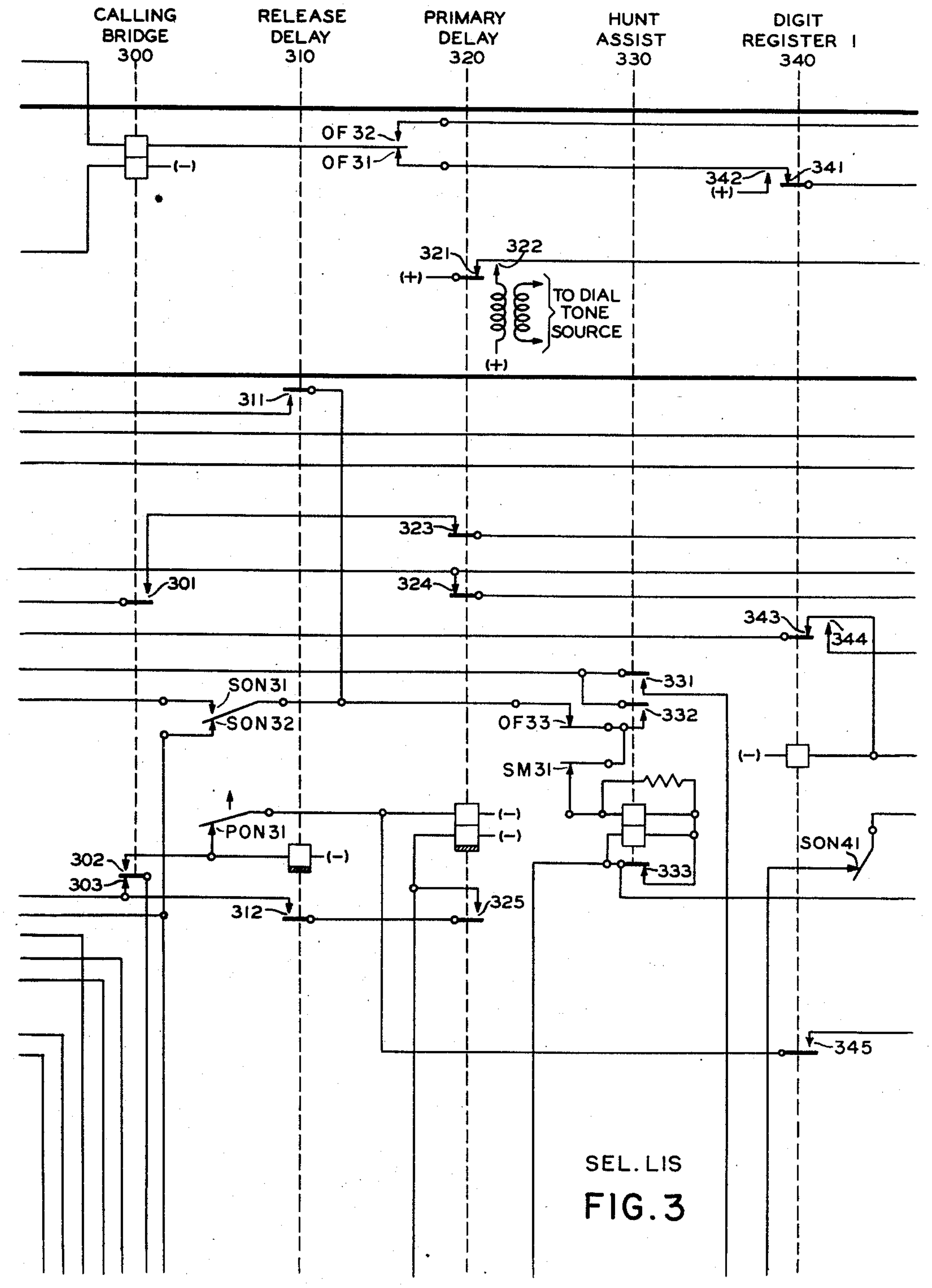
Figure 4:
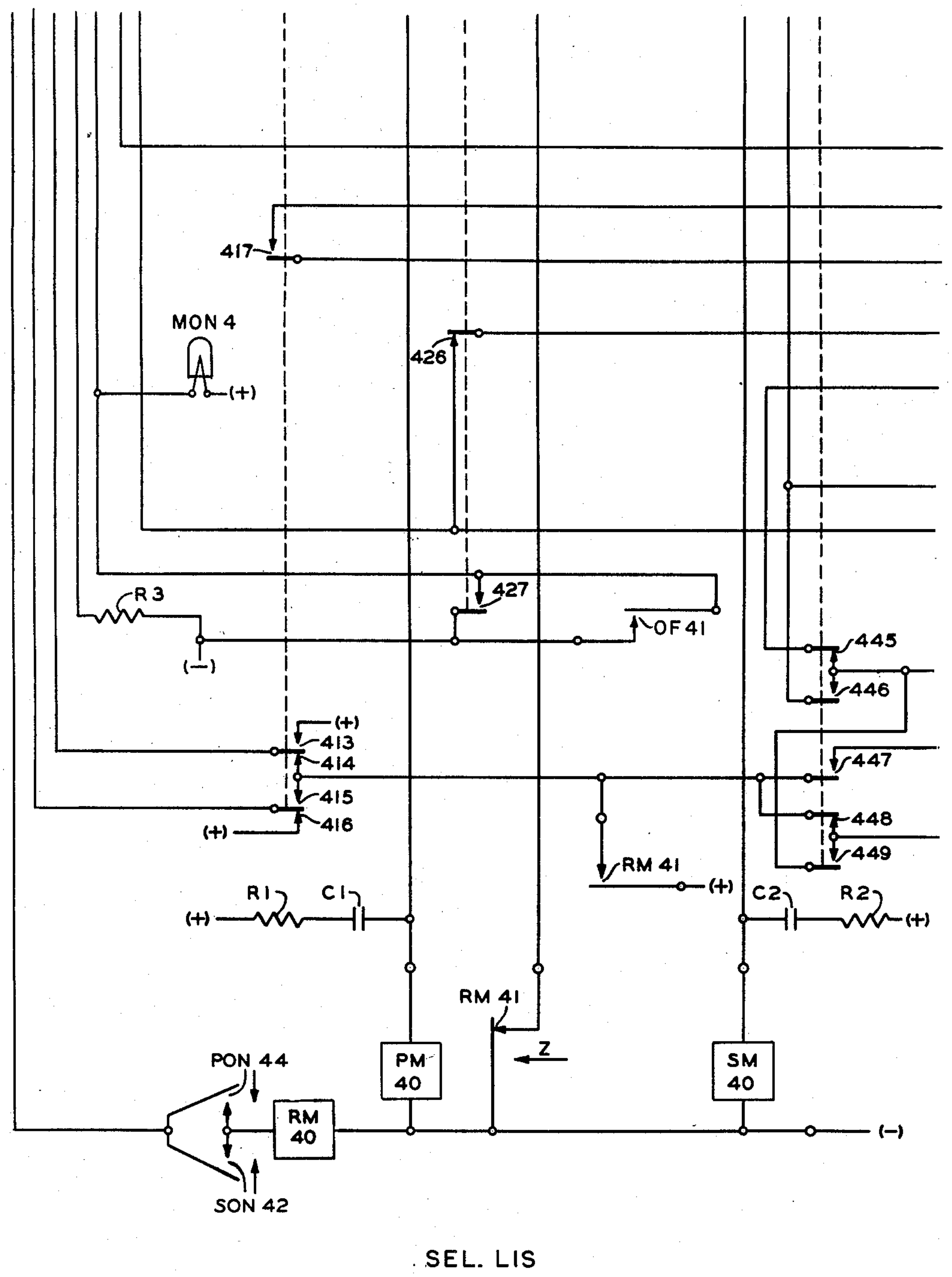
Figure 5:
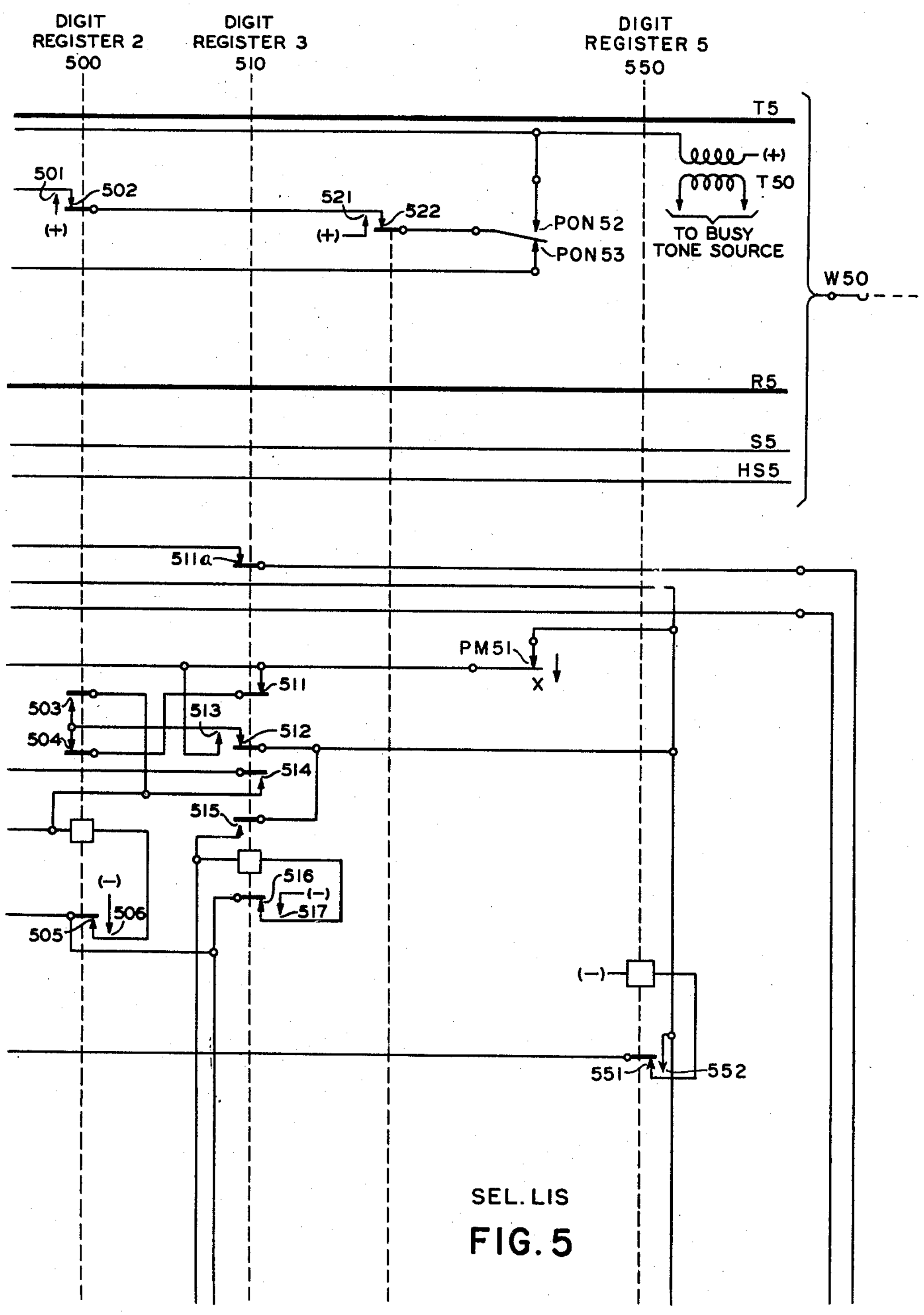
Figure 6:
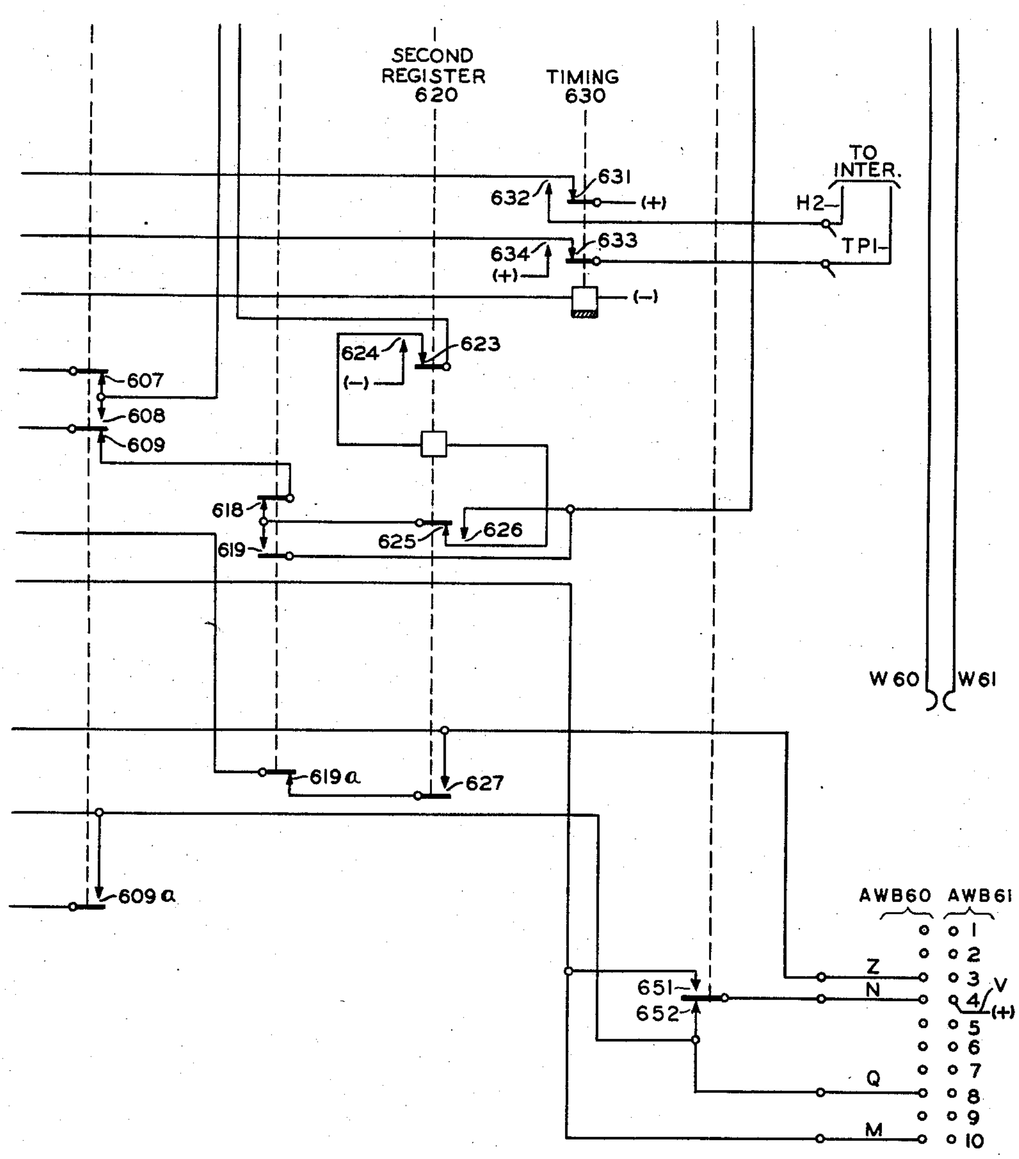

The apparatus referred to in the following description is made to function from power supplied from a source such as a battery. The most positive plate or terminal of the battery is connected to ground and is hereafter referred to as "ground" in the specification and as (+) in the drawings. The most negative, ungrounded plate or terminal of the battery is referred to as "battery" in the specification and as (—) in the drawings.

Because the present invention lies in selector L1S which is incorporated in a telephone system and must be explained in terms of its relationship to the other elements of the telephone system, reference is made in the following description to the telephone system as a whole. However, because the apparatus lying outside selector L1S functions in any number of ways well understood by those skilled in the telephone art, the description of the operation of such other elements is set forth in general terms only except in those instances where the external apparatus contributes directly to the operation of selector L1S.

*General description of the system*

Figure 7:
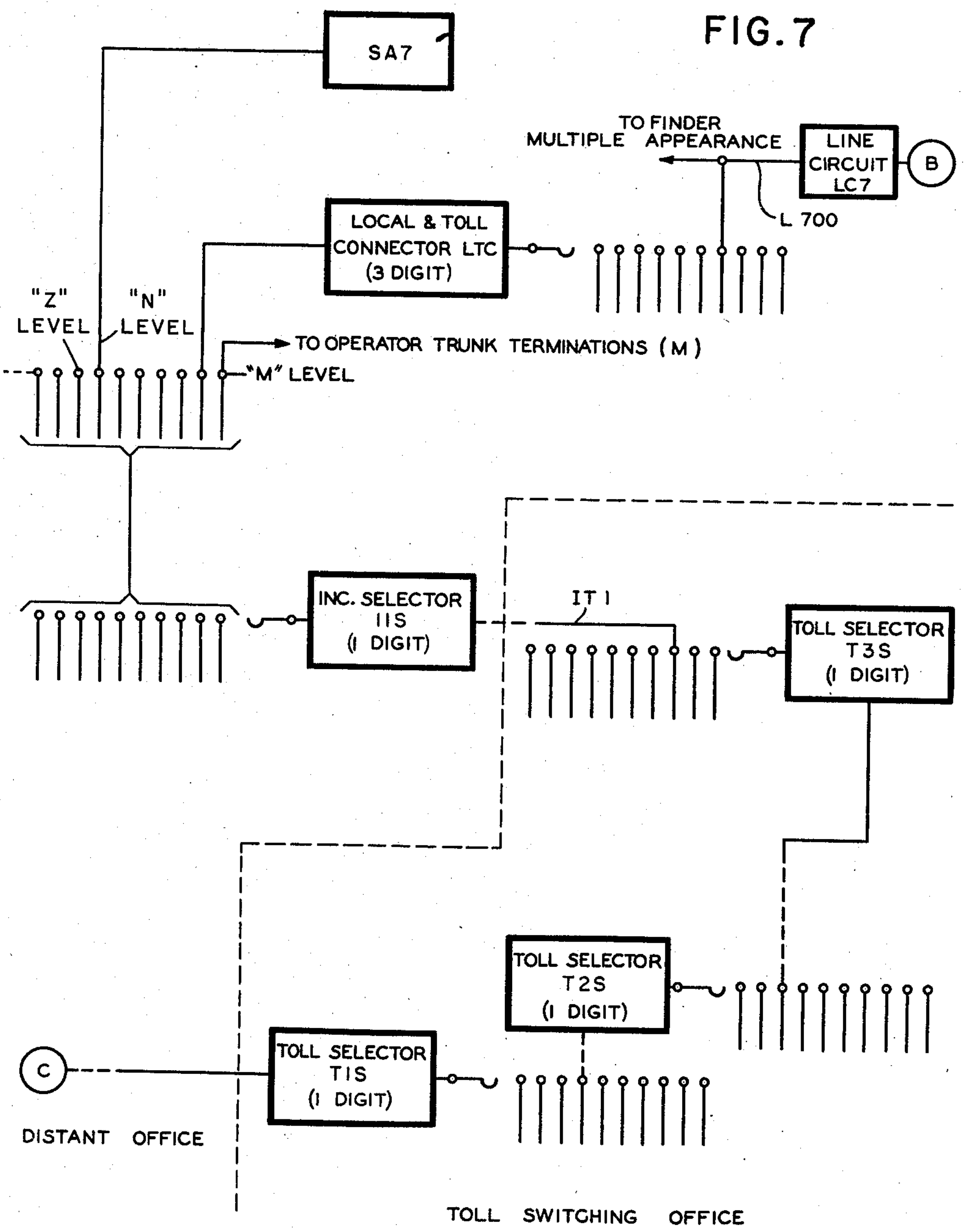

In the contemplated system, a call from a distant office station such as C shown in Fig. 7 may be completed to a called station such as B in the office hereafter referred to as the local office, which also includes a link comprising line finder LF2 shown in Fig. 2, a local selector L1S shown in Figs. 2–6, and a local and toll connector LTC shown in Fig. 7. The connection from station C is extended by means not shown to the toll switching office comprising toll selectors T1S, T2S and T3S. The subsequent transmission of an office code signal comprising a plurality of directive signals or digit impulses from station C is effective for extending a connection from station C through the selectors of the toll switching office. If the transmitted signals are the same as the code of the above-referred to local office, selectors TS1, TS2, and TS3 are advanced to extend the connection from station C to the terminals of a trunk line IT1. Line IT1 is terminated at its distant end in an incoming selector switch I1S in the local office. For the purpose of description, assume that the office code required to direct the toll switching office apparatus includes three signals or digits in which the second and third signals are similar to each other and different from the first signal, such as the code 433.

After a connection has been extended from station C to selector I1S, further directive signals comprising a line code or selecting digit impulses subsequently transmitted from station C are effective to step the incoming selector I1S and that part of the link apparatus in the local office which is required to complete the desired connection between station C and called station B. For example, the first of these line code signals, such as the digit "9," advanced selector I1S to the ninth level. Selector I1S thereafter hunts within the ninth level and seizes an idle one of the local and toll connectors, such as LTC. The transmission of the remaining line code signals of station B from the calling station C is effective to cause the advance of connector LTC to the terminals of the called station line, such as LC2, and thereafter to cause connector LTC to signal called station B.

Thus it is seen that the three office code signals followed by a number of line code signals must be transmitted from the calling station in the distant office in order to extend a connection from the distant office station to a local office station by way of the toll switching office. In a multioffice system of the type being considered here, it is necessary to assign such a combination of office selecting and line selecting code signals to each station in the system in order to create a uniform numbering scheme for the whole system.

Referring now to the case of a call extended from a calling station, such as A, within the local office to a called station, such as B, within the same office, it is necessary to make it possible for the subscriber to dial all the office line code signals of the called station in order to preserve the uniform numbering system. It is pointed out that the office code digits do not direct switching apparatus within the local office, but are absorbed within the switch train, preferably within selector L1S. The selector is unlocked (i.e., prepared to receive a subsequently transmitted directive signal) in the process of absorbing the office code signals. In order to speed the dialing or selecting process, selector L1S is arranged to unlock in response to the receipt of only the last digit of the office code. When the selector has been unlocked, its wiper set may then be advanced within the one of the levels selected in response to the receipt of the next succeeding signal. The last-mentioned signal is also the first digit of the called line code. The advance of the wiper set within a selected level is effective in the above-described manner to select an idle connector such as LTC. Thereafter the transmission of the remaining line code digits through selector L1S to connector LTC is effective to select and signal called station B in the previously described manner. In the case illustrated in the following pages, it is assumed calls are extended over connectors terminated in the ninth level of selector L1S.

*Extension of a connection to selector L1S*

To originate a call from the station within the local office, the telephone at the calling station A is removed from its hookswitch in order to energize line circuit LC2. The energization of line circuit LC2 is effective to cause line finder LF2 to be advanced by means not shown to the terminals in the line finder multiple. Upon such an advance of the line finder a connection is extended from station A through the corresponding conductors of line L200, line circuit LC2, and line finder LF2 to incoming tip and ring conductors T and R of the selector L1S connected to line finder LF2. The extension of such a connection is effective to complete an operating circuit for calling bridge relay 300 and for energizing the transmitter at station A as follows: from ground through break contacts 321, primary off-normal break contacts PON53, break contacts 522, 502 and 341, overflow break contacts OF31, the upper winding of relay 300, break contacts 201, incoming conductor T, the corresponding tip conductors of line finder LF2, line circuit LC2 and line L200, the pulsing contacts D200 of the station A dial, the ring conductor of line L200, line circuit LC2, and line finder LF2, incoming conductor R, break contacts 203, and the lower winding of relay 300 to battery. Relay 300 thereupon operates and is thereafter effective for repeating signals comprising trains of impulses transmitted to the selector by the repeated opening and closing operation of contacts D200 at station A.

The operation of relay 300 is effective for operating release delay relay 310 by completing a circuit for energizing the winding of relay 310 from ground through break contacts 631, make contacts 302 and the winding of relay 310 to battery. The operation of relay 300 is also effective for completing an operating circuit for primary delay relay 320 from ground through break contacts 631, make contacts 302, primary off-normal break contacts PON31, and the upper winding of relay 320 to battery. Relay 320 thereupon operates.

The operation of relay 310 is effective for connecting ground to incoming conductor S of selector L1S in order to mark line finder LF2 and line circuit LC2 as busy to other equipment within the office and to hold the preceding circuits in their operated conditions. The circuit for extending the busy marking ground is traced from ground through make contacts 413, break contacts on the busy key and incoming conductor S. The operation of relay 310 is also effective for preparing: an operating circuit for primary magnet PM40 at make contacts 312; a testing circuit for determining whether or not a set of terminals engaged by the main wiper set of selector L1S is in busy or idle condition at make contacts 311; and a circuit for operating timing relay 630 at make contacts 417.

The operation of relay 320 is effective for transferring the operating loop of relay 300 from the above-described ground connection at break contacts 321 to a low impedance tone source at make contacts 322. This transfer effectively connects dial tone to the receiver (not shown) of the telephone at station A in order to indicate to the subscriber at station A that selector L1S is in condition to receive directive signals. The operation of relay 320 is further effective for preparing a holding circuit for itself in parallel with the pulsing circuit of the primary stepping magnet PM40 at make contacts 325.

*Primary movement of the selector*

The transmission of a signal or train of digit impulses from dial contacts D200 at station A is effective for causing relay 300 to release and reoperate in response to each individual impulse within the train of impulses. During the transmission of such a train of impulses, relay 310, being a slow release type, remains operated even though its operating circuit is intermittently opened at make contacts 302. In response to each release of relay 300 and to the operation of relay 310, a circuit is completed for operating means comprising primary magnet PM40 for advancing the main wiper set shown collectively as wiper W50 in its primary direction. The circuit is traced from ground through break contacts 631 and 303, make contacts 312 and 325, and the winding of magnet PM40 to battery. Each energization of magnet PM40 is effective to advance wipers W50 one step away from their primary position and to place them opposite one of the plurality of levels of terminal sets to which selector L1S has access. Wiper set W50 may thus be directively operated in order to select one of the levels. The completion of the above-traced operating circuit from magnet PM40 also completes a holding circuit comprising the lower winding of relay 320 with the winding of magnet PM40.

Meanwhile, off-normal means including break contacts PON31 are operated in response to the advance of the main wiper set away from its normal position in the primary direction, thereby opening the above-traced operating circuit for primary delay relay 320. Relay 320, being a slow release type, remains in its operated condition throughout the impulsing operation owing to the intermittent energization of its lower winding. At the conclusion of the transmission of the impulse train, relay 320 comes to rest in its operated condition. Thus, the above-described energizing circuit for magnet PM40 and the holding circuit for relay 320 are opened at break contacts 303. Relay 320 thereafter releases.

Each energization of magnet PM40 is effective for advancing auxiliary wipers W60 and W61 one step away from their normal position and into engagement with successive ones of the terminals in auxiliary wiper banks AWB60 and AWB61 respectively. Thus, at the time that main wiper sets W50 are advanced directively to one of the levels to which selector L1S has access, wipers W60 and W61 engage terminals in auxiliay wiper banks AWB60 and AWB61, respectively, corresponding to the selected level.

*Secondary movement of the selector*

Assuming that the one of the levels selected by wiper set W50 is used for terminating trunks to which access is to be had in response to the dialing of a single train of digit impulses, such as the tenth, on which operator access trunk terminations are located, a circuit is completed for energizing means comprising hunt assist relay 330 which is effective for advancing the main wiper set W50 into engagement with the first terminal set within the selected level. Single digit access levels such as the tenth are characterized by the connection of the M conductor to the corresponding AWB60 terminal. Thus, upon the selection of the tenth level and the release of relay 320, a circuit is completed for energizing relay 330 as follows: from ground through make contacts 413, break contacts 208 and 324, wiper W60, M wiring, secondary off-normal break contacts SON32, overflow break contacts OFB3, secondary magnet interrupter break contacts SM31, the windings of relay 330, and release magnet break contacts RM41 to battery. Relay 330 thereupon operates.

The operation of relay 330 is effective for closing a locking circuit for itself from ground through make contacts 413, break contacts 209*a*, make contacts 332, break contacts SM31, the winding of relay 330 and break contacts RM41 to battery. The operation of relay 330 is also effective for closing an energizing circuit for secondary magnet SM40 from ground through make contacts 413, break contacts 209*a*, make contacts 331, and magnet SM40 to battery. The energization of magnet SM40 is effective for advancing the main wiper set W50 into engagement with the first terminal set within the selected level. Upon the energization of magnet SM40, break contacts SM31 are opened, thereby opening the above-traced operating circuit for relay 330. Relay 330 releases at this time.

Other means comprising secondary off-normal contacts are operated in response to the advance of the wiper set W50 into engagement with any of the terminal sets within a selected level and remain operated so long as the main wiper set is within the level. Therefore, the above-traced energizing circuit including wiper W60 for originally operating relay 330 is opened at break contacts SON32. Thereafter, the main wiper set W50 is advanced within the selected level in a hunting operation in the next described manner.

Further stepping of the main wiper set within the selected level is dependent upon the busy or idle condition of the terminal sets engaged by the main wiper set. Busy terminals are characterized by the connection of ground to the one of the terminal sets engaged by the wiper which is connected to conductor S5. An idle condition is indicated, in the example chosen here, by the absence of such ground potential. A testing circuit comprising conductor S5, break contacts 205, make contacts 311, and break contacts OF33 and SM31 connect the winding of hunt assist relay 330 to the terminal of the set engaged by the main wiper set W50. The presence of ground potential on the testing circuit reoperates relay 330 thereby re-energizing magnet SM40 over the above-described circuit in order to advance the main wiper set in the secondary direction into engagement with the next succeeding terminal set within the selected level. As before, the operation of relay 330 is effective for establishing a locking circuit for itself at make contacts 332. Similarly, the energization of magnet SM40 is effective for opening the locking circuit of relay 330 at break contacts SM31 in order to release relay 330 after the main wiper set has been advanced into engagement with the next succeeding terminal set. The hunting operation is continued in this manner until an idle terminal set is located.

It is pointed out that the busy-indicating ground on the above-described testing circuit is extended to the right-hand winding terminal of the winding of switch-through relay 200 over the following circuit: from conductor SS through break contacts 205, make contacts 311, break contacts OF33, make contacts 332, now closed make contacts SON31 to the winding terminal. This prevents relay 200 from operating because the busy-indicating ground is effective to short out the winding, the other (left-hand) winding terminal being connected to ground through make contacts 413.

Upon the advance of wiper set W50 to engagement with an idle terminal set, ground is not applied to the above-traced test circuit so that relay 330 is not reoperated. The above-referred to shorting ground applied to the right-hand winding terminal of relay 200 is removed. Thereupon, an operating circuit for switch-through relay 200 is made effective. The latter circuit is traced from battery through break contacts RM41, the windings of relay 330, break contacts SM31 and OF33, make contacts SON31, the winding of relay 200, and make contacts 413 to ground. Current flowing in the above-traced circuit is insufficient to operate hunt assist relay 330 so that relay 200 operates and relay 330 remains unoperated at this time.

The operation of relay 200 is effective for disconnecting the windings of relay 300 from conductors T and R at break contacts 201 and 203 and for extending a connection from incoming conductors T and R through the wipers connected to the conductors T5 and R5, respectively, to a battery source of the well-known type in the trunk circuit terminated on the selected terminal set at make contacts 202 and 204, respectively. Thereafter, current for operating the transmitter at calling station A is supplied from the succeeding terminating circuit. Similarly, the operation of relay 200 is effective for connecting incoming conductor S to the one of the selected terminal set connected through the wiper of set W50 and conductor S5 at make contacts 206. The operation of relay 200 is effective for extending incoming conductor HS to the terminal of the selected set engaged by the one of wiper set W50 connected to conductor HS5 at make contacts 207.

The above-described disconnection of the windings of relay 300 is effective to release relay 300 at this time. The release of relay 300 opened the above-described operating circuit of relay 310 at make contacts 302. Relay 310 remains operated for the purpose of supplying ground to incoming conductor S at make contacts 413 until the well-known seizure responsive apparatus in the succeeding trunk circuit terminated on the selected terminal set has time to pass back ground over the above-traced circuit to incoming conductor S by way of conductor S5.

*Unlocking the selector in response to the transmission of the office code*

Assume next that the subscriber at station A wishes to establish a connection through the local office switch train to another subscriber station such as B, and further that the subscriber at station A elects to dial both the whole office digit code as well as the line digit code of the called station. The transmission of the first signal or train of digit impulses to the selector from dial contacts D200 is effective in the above-described manner for causing the advance of the main and auxiliary wiper sets.

Selector L1S includes relistering means having a normal dition and first, intermediate, and last operated conditions for recording successive primary movements of the wiper set during the unlocking operation. The registering means include digit register 1 relay 340, digit register 2 relay 500, digit register 3 relay 510, digit register 4 relay 620, and digit register 5 relay 550. The registering means is in its normal condition when all its relays are released; first condition when only relays 340 and 550 are operated; its intermediate condition when relays 340, 500, 550 are operated; and its last condition when relays 510, 550 and 620 are operated.

*Absorbing the first digit.*—In the example chosen for discussion, the first office code digit is "4." Thus, auxiliary wipers W60 and W61 are advanced in the above-described manner to the terminals corresponding to the fourth level in auxiliary wiper banks AWB60 and AWB61, respectively. Wipers W60 and W61 operated to the fourth level terminals in banks AWB60 and AWB61 are effective for placing the registering means in its first operated condition by completing an operating circuit for relay 340 upon the release of primary delay relay 320. The circuit is traced from ground through conductor 4 in AWB61, wiper W61, break contacts **511*a* and 323, make contacts 301, break contacts 209 and 343, and the winding of relay 340 to battery. Relay 340 thereupon operates and establishes for itself a locking circuit traced from ground through make contacts 413, break contacts 208, 512, 504, and 511, make contacts 344, and the winding of relay 340** to battery.

The operation of the registering means to each of its various conditions is effective each time for closing an operating circuit for releasing means comprising magnet RM40. The operation of magnet RM40 is effective for restoring the main wiper set W50 and auxiliary wipers W60 and W61 from their advanced positions to normal position. Thus, the operation of relay 340 is effective in response to the advance of the wipers W60 to the N wire connected to terminal 4 in bank AWB60 and to the release of primary delay relay 320 for completing an energizing circuit for release magnet RM40 from battery through the winding of magnet RM40, now closed primary off-normal make contacts PON44, break contacts **209*c*, make contacts 415 and 447, break contacts 652, N wiring, wiper W60, break contacts 324 and 208, and make contacts 413** to ground.

Following the restoration of wiper set W50 to its normal positon, the primary off-normal means is again restored to normal position in order to reestablish the above-traced operating circuit for relay 320 at break contacts PON31. Relay 320 thereupon reoperates. In response to the reclosing of break contacts PON31 and the operation of relay 340, a circuit is completed for operating digit register 5 relay 550 which is traced from ground through break contacts 631, make contacts 302, break contacts PON31, make contacts 345, break contacts 551, and the winding of relay 550 to battery. Relay 550 thereupon operates and establishes a locking circuit for itself from battery through the winding of relay 550, make contacts 552, break contacts 208, and make contacts 413 to ground. Relay 550 thereupon operates with effects which are to be explained later in this description.

*Absorbing the second digit.*—In response to the restoration of the main wiper set to its normal position and the resulting reoperation of relay 320, the above-described circuit for primary magnet PM40 is again prepared at make contacts 325. Thus upon the transmission of the second office code digit, magnet PM40 is again energized in the above-described manner so that wiper set W50 is again advanced in its primary direction to the level corresponding to the second office code digit. In the example chosen for discussion here a second office code digit is assumed to "3" and is characterized by the connection of Z wiring to the terminal 3 of auxiliary wiper bank AWB60. In response to the advance of wiper W60 to terminal 3 in bank AWB60 and the restoration of primary delay relay 320 to its normal condition at the conclusion of the transmission of the second digit the Z wiring is energized. In response to the energization of the Z wiring and to the operation of the registering means to the above-described first condition, a circuit is completed for operating digit register 2 relay 500 in order to place the registering means in its intermediate condition. The circuit is traced from battery through break contacts RM41 and 505, the winding of relay 500, break contacts SON41, make contacts 446, Z wiring, terminal 3 of bank AWB60, wiper W60, break contacts 324 and 208, and make contacts 413 to ground. Relay 500 thereupon operates and completes a locking circuit for itself from battery through make contacts 506, the winding of relay 500, make contacts 503, break contacts 512 and 208, and make contacts 413 to ground. The operation of relay 500 is effective for preparing an operating circuit for relay 510 at make contacts 608 and for completing an energizing circuit for magnet RM40 which is traced from ground through make contacts 413, break contacts 208 and 324, wiper W60, terminal 3 of bank AWB60, Z wiring, make contacts 449, **609*a*, 447 and 415, break contacts 209*c***, operated make contacts PON44, and the winding of magnet RM40 to battery.

The operation of relay 500 is effective to open the above-traced locking circuit for relay 340 at break contacts 504. Thereafter, relay 340 is held in its operated condition through an alternate locking circuit traced from battery through the winding of relay 340, make contacts 344, break contacts PM51 and 208, and make contacts 413 to ground.

The wiper set W50 thereupon restores to its normal position. Upon the restoration of the wiper set to its normal position the off-normal means including the primary off-normal springs are restored to normal so that the previously traced operating circuit for primary delay relay 320 is reclosed at break contacts PON31. Relay 320 thereupon reoperates.

*Absorbing the third digit.*—Upon the transmission of the third and last office code digit to the selector from calling station A, the primary magnet is again energized in response to the impulsing operation of relay 300 and to the steady operation of relays 310 and 320 in the previously described manner. During the primary advance of the main wiper set, the operation of magnet PM40 is effective for interrupting the above-traced alternate holding circuit for relay 340 at primary interrupter contacts PM51 each time magnet PM40 is energized. Thereupon, relay 340 releases. The release of relay 340 is effective for preparing an operating circuit for digit register 3 relay 510, which is next described.

As previously pointed out, the second and third office code digits suitable for unlocking the selector forming the preferred embodiment of my invention are alike and further that it has been assumed that the second and third office code digit is "3." Thus upon the directive advance of the wiper W60 into engagement with bank terminal 3 of bank AWB60 a circuit for reenergizing the Z wiring is again completed. The energizing of the Z wiring, the operation of relay 500, and the release of relay 340 are effective for completing an operating circuit for relay 510. The latter circuit is traced from ground through make contacts 413, break contacts 208 and 324, wiper W60, terminal 3 in bank AWB60, Z wiring, break contacts 445, make contacts 608, the winding of relay 510, break contacts 516 and RM41 to battery. Relay 510 thereupon operates.

The operation of relay 510 is effective for establishing a locking circuit for itself from battery through make contacts 517, the winding of relay 510, make contacts 515, break contacts 208, and make contacts 413 to ground. The operation of relay 510 is further effective for completing an operating circuit for digit register 4 relay 620 from ground through make contacts 413, break contacts 208, make contacts 619, break contacts 625, the winding of relay 620 and break contacts 623 and RM41 to battery. The operation of relay 510 is further effective for opening the above-described holding circuit for relay 500 at break contacts 511, and closes an alternate holding circuit for that relay at make contacts 513. The latter circuit is traced from battery through make contacts 506, the winding of relay 500, make contacts 503 and 513, break contacts PMS1 and 208, and make contacts 413 to ground. The operation of relay 510 is further effective for closing an alternate operating circuit for relay 340 which is traced from ground through make contacts 413, break contacts 208 and PM51, make contacts 513, 503 and 514, and the winding of relay 340 to battery.

The operation of relays 340 and 500 and the release of relay 320 is effective for closing the above-traced circuit for energizing magnet RM40 over the circuit which includes the Z wiring and make contacts 449, 609*a* and 447. The main wiper set W50 as well as the auxiliary wipers W60 and W61 are again restored to their normal positions. As in the previously described cases the restoration of the switch wipers to their normal positions is effective for reclosing contacts PON31 so that primary delay relay 320 is again reoperated. With relays 340, 500, 510 and 620 in operated condition, the registering means is prepared to go into its final condition, i.e., where relay 510, 550, and 620 are operated.

*Transmission of the first line code digit.*—Upon the transmission of the succeeding digit impulses of the first digit of line code of called station B, primary magnet PM40 is again energized in the previously described manner in order to advance wiper set W50 to the ninth level in which connectors such as LTC are terminated. The operation of magnet PM40 is effective for opening the above-traced alternate holding circuit for relay 500 and the alternate operating circuit for relay 340 at break contacts PM51. Relays 340 and 500 thereupon release in order to place the registering means in its third or final condition.

Following the transmission of the first line code signal to selector L1S, primary delay relay 320 is again released in the previously described manner. In response to the release of relay 320 and to the operation of the registering means to its final condition, a circuit is completed for energizing hunt assist relay 330. The circuit is traced from ground through make contacts 413, break contacts 208, make contacts 515, break contacts 607, 426, SON32, OF33 and SM31, the windings of relay 330, and break contacts RM41 to battery. Upon the energization of relay 330, the previously described circuit for energizing magnet SM40 is completed so that the main wiper set W50 is advanced to engage the first terminal set within the ninth level. Thereafter, selector L1S hunts in the previously described manner across the terminal sets located in the ninth level in order to select an idle one of the terminal sets. When an idle terminal set has been located, the hunting operation is discontinued and the switchthrough relay 200 is operated in the previously described manner in order to disconnect relay 300 from the connection to the loop of calling station A and to seize the succeeding connector such as LTC by extending the loop from calling station A through selector L1S and the corresponding wipers of the W50 set in the battery feed relay of the connector.

In the case of the switchthrough operation of selector L1S after the unlocking operation of the selector caused by the transmission of the office code digits, relay 200 operates with the previously noted effects and in addition opens the locking circuits for relays 510 and 620 at break contacts 208. Relays 510 and 620 thereupon release.

*Transmission of the remaining line code digits*

Following the switchthrough operation of selector L1S, the subscriber at the calling station A manipulates the dial at station A to transmit the remainder of the line code digit signals to the remaining switches in the local office link, in this case connector LTC. Connector LTC is thereupon advanced by well-known means to the termination of line circuit LC7, signals the required station B on the called line, and thereafter establishes a connection from station A to called station B upon the transmission of answer supervision from called station B to connector LTC.

*Unlocking the selector in response to the transmission of a single digit*

Assuming that instead of transmitting the three office code digits, as described above, the subscriber at station A causes the last of the office code digits to be transmitted to selector L1S as a first digit. The registering means comprising relays 340, 500, 510, 620 and 550 are operative to the above-described last operated condition without having to be operated through the first and intermediate conditions. Thus, in the event that a main wiper set W50 is advanced to the third level so that auxiliary wiper W60 engages terminal 3 of auxiliary wiper bank AWB60, a circuit is completed in response to the release of primary delay relay 320 and to the normal condition of the registering means for operating the digit register 4 relay 620. The latter circuit is traced from ground through make contacts 413, break contacts 208 and 324, wiper W60, terminal 3 of bank AWB60, Z wiring, break contacts 445, 609, 618 and 625, the winding of relay 620, and break contacts 623 and RM41 to battery. Relay 620 thereupon operates.

The operation of relay 620 at this time (i.e, in response to the otherwise normal condition of the registering means) is effective for completing the above-traced locking circuit for itself and for completing a circuit for operating relay 500. The latter circuit is traced from ground through make contacts 413, break contacts 208 and 324, wiper W60, Z wiring, make contacts 627, break contacts 619*a* and SON41, the winding of relay 500, and break contacts 505 and RM41 to battery. Relay 500 thereupon operates.

The operation of relay 500 is effective for closing the above-traced alternate locking circuit for itself including make contacts 503 and 512 and break contacts PM51. The operation of relay 500 is effective for closing the previously traced operating circuit for relay 510 from ground extended over the previously described circuit to Z wiring through break contacts 445, make contacts 608, and the winding of relay 510, thence to battery through break contacts 516 and RM41. The operation of relay 510 is effective for completing the above-traced alternate operating circiut for relay 340 including make contacts 514, 503 and 513, and break contacts PM51. Relay 340 thereupon operates.

The operations of relays 340 and 500 is effective in the previously described manner for extending the ground connection from Z wiring through the winding of magnet RM40 over the path including make contacts 449, 609*a* and 447. Thereupon magnet RM40 operates to restore wiper set W50 and auxiliary wipers W60 and W61 to normal position. The registering means is now in condition to be advanced into its third or final condition.

Upon the transmission of the next succeeding signal of the subscriber line directory number, i.e., the first of the line code digits, the previously described holding circuits for relays 340 and 500 are opened at break contacts PM51 as primary magnet PM40 is operated. As in the previously described manner, relays 340 and 500 restore to their normal condition and the registering means is placed in its third condition. As in the previously described case the restoration of primary delay relay 320 to its normal condition following the transmission of the first line code digit to selector L1S and the registering means operated to its third condition is effective for closing the original energizing circuit for hunt assist relay 330 over the previously described circuit including break contacts 607 and 426. Thus the wiper set W50 is caused to operate within the level selected in response to the digit transmitted to selector L1S after the final digit of the office code has been transmitted to selector L1S.

*Office codes having more than three digits*

While in the case described thus far it has been assumed that a three digit office code is transmitted to the selector L1S, it is pointed out that after the registering means has been placed in its first operated condition, i.e., only relay 340 and 550 operated, the transmission of digit impulses effective for operating the main wiper set to levels marked on the auxiliary bank AWB60 by N wiring or by N and V wiring and banks AWB60 and 61, respectively, is effective for reclosing the above-traced circuit including break contacts 562 and make contacts 447 for energizing release magnet RM40. In this manner, any indefinite number of such signals can be transmitted to the selector following the transmission of the first office code digit.

Similarly, after the registering means has been placed in the above-described second condition (with relays 340, 500 and 550 operated), the transmission of a signal for moving wiper set W50 to a level where auxiliary wiper W60 is advanced to the AWB60 terminal to which Q wiring is connected is effective for reclosing the above-traced energizing circuit for magnet RM40 except that the circuit now includes Q wiring, make contacts 447 and 415, break contacts 209*c*, make contacts PON44, and the winding of magnet RM40 instead of N wiring and break contacts 652, etc.

*Unlocking the selector in response to the transmission of the first office code digit*

Following the dialing of the first office code digit into selector L1A and the operation of the registering means to its first condition as in the above-described manner, the operation of digit register 5 relay 550 places the registering means in condition to unlock only certain specific levels upon which special access trunks such as SA7 are terminated. In the case chosen for discussion here the trunks are shown terminated on the level corresponding to the first office code digit. Thus, upon the next advance of the wiper set W50 to the level corresponding to the first office code digit and the advance of auxiliary wiper W60 into engagement with the terminal of bank AWB60 to which N wiring is connected, a circuit is completed for operating relay 330. The latter circuit is traced from ground through make contacts 413, break contacts 208 and 324, auxiliary wiper W60, terminal 4 of the bank AWB60, make contacts 651 to the M wiring and the previously described circuit for originally energizing relay 330. Relay 330 is thereupon energized in order to operate magnet SM41 in the previously described manner. Upon the energization of magnet SN40, the main wiper set W50 is advanced within the fourth level to engage the first terminal set in that level. Thereafter the hunting operation takes place in the previously described manner until an idle terminal set is located.

*Release of the switch train*

At the conclusion of the completed call, the release of the connection takes place in the normal manner by the removal of the holding ground from the one of wiper sets W50 to which conductor S5 is connected. In the present case the ground is applied within connector LTC. The previously described locking circuit for switchthrough relay 200 is thereupon opened so that relay 200 releases. The release of relay 200 is effective for completing an operating circuit for magnet RM40. The latter circuit is traced from ground through break contacts 416 and 209*c*, operated make contacts PON44 and SON42 in parallel, and the winding of magnet RM40 to battery. Wiper set W50 and auxiliary wipers W60 and W62 are thereby restored to their normal positions. Selector L1S is thereupon in normal condition and ready for the extension of further calls. The removal of ground from conductor S5 is effective for bringing about the release of line finder LF2 and for restoring line circuit LC2 to its normal condition in a manner well understood to those skilled in the telephone art.

While I have shown and described a specific embodiment of my invention, other modifications will readily occur to those skilled in the art. I do not, therefore, desire my invention to be limited to the specific arrangement shown and described and I intend in the appended claims to uncover all modifications which fall within the spirit and scope of my invention.

What I claim is:

1. In a telephone system comprising a selector and means for transmitting directive signals to said selector, wherein said selector includes a set of switch wipers having a normal position and a plurality of levels of contacts disposed for engagement by said wiper set, said levels including first and second particular levels, means operative in response to the receipt of directive signals for moving said wiper set in a primary direction to any one of said plurality of levels, means for releasing said wiper set from an operated position to said normal position, means for advancing said wiper set in a secondary direction within the selected one of said levels in a hunting operation, a circuit for initiating the operation of said secondary advancing means, registering means having a normal condition and first, intermediate, and last operated conditions, means operative in response to a first primary movement of said wiper set to said first level for operating said registering means to its first condition, means operative in response to an intermediate movement of said wiper set to said second level while said registering means is in said first operated condition for operating said registering means to said intermediate condition, and means operative in response to a succeeding primary movement of said wiper set to said second level while said registering means is in said second condition for operating said registering means to said last operated condition, and means including said registering means in any of the aforementioned operated conditions effective for operating said releasing means at the end of each signal in order to prepare said selector to receive a subsequent signal; wherein said registering means in said last operated condition is operative in response to a subsequent primary advance of said wiper set for completing said secondary advancing means operating circuit in order to initiate a hunting operation in any selected one of said levels, and said registering means in said normal condition is operative in response to a first primary movement of said wiper set to said second level for placing said registering means in said last operated condition; in combination with: an alternate path for completing said secondary advancing means operating circuit, and single digit means effective in response to a subsequent movement of said wiper set to a particular one of said levels and to the operation of said registering means to its first condition for completing said secondary advancing means operating circuit over said alternate path, whereby said wiper set may be advanced within a selected one of said levels following the transmission of an office code comprising first, intermediate and last directive signals effective for moving said wiper set in its primary direction to said first, said second and said second levels respectively, or in response to a primary movement of said wiper set to a selected one of said levels following the transmission of a single signal effective to move said wiper set to said second level, and said wiper set may be advanced within the particular one of said levels after a preliminary advance of said wiper set to said first level.

2. The selector set forth in claim 1 wherein: the particular one of said levels to which said wiper set may be advanced is the same as said first level, and said single digit means includes means operative in response to the operation of said registering means to said first condition and to a subsequent movement of said wiper set to said first level for completing said secondary advancing means operating circuit over said alternate path, whereby said wiper set may also be advanced within said first level after the second of two successive advances of said wiper set to said first level.

3. The selector set forth in claim 1 wherein: said single digit means includes means operative in response to the operation of said registering means to said first operated condition for rendering said releasing means inoperative upon a subsequent advance of said wiper set to said first level.

4. The selector set forth in claim 1 wherein: said single digit means includes means operative in response to the operation of said registering means to said first operated condition for rendering said releasing means ineffective upon a subsequent advance of said wiper set to said first level and operative in response to the operation of said registering means to said first operated condition and to a subsequent movement of said wiper set to said first level for completing said secondary advancing means operating circuit over said alternate path whereby the particular one of said levels to which said wiper set may be advanced is the same as said first level and said wiper set may be advanced within said first level after the second of two successive advances of said wiper set to said first level.

5. In a telephone system comprising a selector and means for transmitting directive signals to said selector, wherein said selector includes a set of switch wipers having a normal position and a plurality of levels of contacts disposed for engagement by said wipers, said levels including first and second particular levels, means operative in response to the receipt of directive signals for moving said wiper set in a primary direction to any one of said plurality of levels, means for releasing said wiper set from an operated position to said normal position, means for advancing said wiper set in a secondary direction within the selected one of said levels in a hunting operation, a circuit for initiating the operation of said secondary advancing means, registering means having a normal condition and first, second, and last operated conditions, means operative in response to a first primary movement of said wiper set to said first level for operating said registering means to its first condition, means operative in response to a second primary movement of said wiper set to said second level while said registering means is in said first operated condition for operating said registering means to said second operated condition, and means operative in response to a third primary movement of said wiper set to said second level while said registering means is in said second condition for operating said registering means to said last operated condition, and means including said registering means in any of the aforementioned operated conditions effective for operating said releasing means at the end of each signal in order to prepare said selector to receive a subsequent signal; wherein said registering means in said last operated condition is operative in response to a subsequent primary advance of said wiper set for completing said secondary advancing means operating circuit in order to initiate a hunting operation in any selected one of said levels, and said registering means in said normal condition is operative in response to a first primary movement of said wiper set to said second level for placing said registering means in said last operated condition; in combination with: an alternate path for completing said secondary advancing means operating circuit, and means effective in response to the subsequent movement of said primary set to said first level and to the operation of said registering means to said first condition for completing said secondary advancing means operating circuit over said alternate path, said registering means in said first operated condition being rendered ineffective for thereafter operating said releasing means upon a subsequent advance of said wiper set to said first level, whereby said wiper set may be advanced within a selected one of said levels following the transmission of an office code comprising first, second, and third directive signals effective for moving said wiper set in its primary direction to said first, said second, and said second levels, respectively, or in response to a primary movement of said wiper set to the selected one of said levels following the transmission of a single signal effective to move said wiper set to said second level, and said wiper set may be advanced within said first level after the second of two successive advances of said wiper set to said first level.

References Cited in the file of this patent

UNITED STATES PATENTS

| | | |
|---|---|---|
| 2,531,400 | Carson | July 4, 1950 |
| 2,691,066 | Fisher | Oct. 5, 1954 |
| 2,721,902 | Pharis | Oct. 25, 1955 |
| 2,748,194 | Gatzert | May 29, 1956 |

UNITED STATES PATENT OFFICE

CERTIFICATE OF CORRECTION

Patent No. 2,892,893 June 30, 1959

William W. Pharis

It is hereby certified that error appears in the printed specification of the above numbered patent requiring correction and that the said Letters Patent should read as corrected below.

Column 7, line 49, for "relistering" read -- registering --; line 50, for the syllable "dition" read -- condition --; column 12, line 32, for "magnet SN40," read -- magnet SM40, --.

Signed and sealed this 15th day of December 1959.

(SEAL)

Attest:

KARL H. AXLINE

Attesting Officer

ROBERT C. WATSON

Commissioner of Patents